(12) United States Patent
Pasqual et al.

(10) Patent No.: US 11,920,853 B2
(45) Date of Patent: Mar. 5, 2024

(54) SHEATHED FIBERGLASS HEATER WIRE

(71) Applicant: Zoppas Industries de Mexico S.A., de C.V., San Luis Potosí (MX)

(72) Inventors: Maurizio Francesco Pasqual, San Luis Potosí (MX); Jose Jesus Reyes Soto, San Luis Potosí (MX); Alessandro Trevisol, San Luis Potosí (MX); Pierpaolo Campeol, San Luis Potosí (MX)

(73) Assignee: Zoppas Industries de Mexico S.A., de C.V., San Luis Potosí (MX)

( * ) Notice: Subject to any disclaimer, the term of this patent is extended or adjusted under 35 U.S.C. 154(b) by 0 days.

(21) Appl. No.: 18/175,014

(22) Filed: Feb. 27, 2023

(65) Prior Publication Data

US 2023/0280083 A1   Sep. 7, 2023

Related U.S. Application Data

(63) Continuation of application No. 15/880,417, filed on Jan. 25, 2018, now abandoned.

(51) Int. Cl.
*H05B 3/54* (2006.01)
*B32B 1/08* (2006.01)
(Continued)

(52) U.S. Cl.
CPC ............. *F25D 21/08* (2013.01); *B32B 1/08* (2013.01); *B32B 17/067* (2013.01);
(Continued)

(58) Field of Classification Search
CPC ... H05B 3/46; H05B 3/48; H05B 3/56; H05B 3/342; H05B 2203/017; H05B 2203/003;
(Continued)

(56) References Cited

U.S. PATENT DOCUMENTS 593,467 A   11/1897   Gottschalk
1,783,554 A   12/1930   Backer
(Continued)

FOREIGN PATENT DOCUMENTS

CN   2490785 Y   5/2002
CN   106488595 A   3/2017
(Continued)

OTHER PUBLICATIONS

International Search Report and Written Opinion received for PCT Application No. PCT/IB2019/000025, dated May 17, 2019, 9 pages.

*Primary Examiner* — Charles P. Cheyney
(74) *Attorney, Agent, or Firm* — Mintz, Levin, Cohn, Ferris, Glovsky and Popeo, P.C.

(57) ABSTRACT

1. An apparatus is disclosed. The apparatus includes a resistive wire having a circumference. The apparatus further includes a first fiberglass layer disposed about the circumference of the resistive wire and along a length of the resistive wire. The apparatus further includes a second fiberglass layer. The apparatus further includes a third fiberglass layer, the second fiberglass layer disposed between the first fiberglass layer and the third fiberglass layer, the third fiberglass layer forming an outer layer and surrounding the second fiberglass layer.

20 Claims, 3 Drawing Sheets

(51) Int. Cl.
   *B32B 17/06* (2006.01)
   *F25D 21/08* (2006.01)
   *H05B 1/02* (2006.01)
   *H05B 3/46* (2006.01)
   *H05B 3/48* (2006.01)
   *H05B 3/56* (2006.01)

(52) U.S. Cl.
   CPC ............ *H05B 1/0227* (2013.01); *H05B 3/46* (2013.01); *H05B 3/48* (2013.01); *H05B 3/56* (2013.01); *B32B 2262/101* (2013.01); *F25D 2321/1413* (2013.01); *F25D 2400/02* (2013.01); *F25D 2400/24* (2013.01); *H05B 2214/02* (2013.01)

(58) Field of Classification Search
   CPC ........ H05B 2203/014; H05B 2203/011; H05B 2203/005; H05B 2203/013; B32B 17/067; B32B 1/08; B32B 2262/101; F25D 21/08
   USPC .......................................... 219/522, 549, 544
   See application file for complete search history.

(56) References Cited

U.S. PATENT DOCUMENTS

| | | | |
|---|---|---|---|
| 1,824,447 A | 9/1931 | Richter | |
| 2,809,359 A | 10/1957 | Slick | |
| 3,410,984 A | 11/1968 | Sandford et al. | |
| 3,727,029 A * | 4/1973 | Chrow | H05B 3/56 |
| | | | 219/535 |
| 4,037,083 A | 7/1977 | Leavines | |
| 4,047,783 A | 9/1977 | Canup et al. | |
| 4,125,761 A | 11/1978 | Churchill | |
| 4,309,597 A | 1/1982 | Crowley | |
| 4,553,023 A * | 11/1985 | Jameson | F16L 53/38 |
| | | | 137/341 |
| 4,575,620 A | 3/1986 | Ishii et al. | |
| 4,607,154 A * | 8/1986 | Mills | H02H 5/043 |
| | | | 361/87 |
| 4,668,857 A | 5/1987 | Smuckler | |
| 5,206,485 A * | 4/1993 | Srubas | H05B 3/146 |
| | | | 219/505 |
| 5,824,958 A | 10/1998 | Higashikozono et al. | |
| 5,824,996 A * | 10/1998 | Kochman | A41D 13/0051 |
| | | | 338/211 |
| 6,300,597 B1 * | 10/2001 | Lee | H05B 1/0272 |
| | | | 219/544 |
| 6,713,733 B2 | 3/2004 | Kochman et al. | |
| 6,943,319 B2 | 9/2005 | Jones | |
| 6,958,463 B1 * | 10/2005 | Kochman | H05B 3/56 |
| | | | 219/505 |
| 7,220,947 B2 * | 5/2007 | Cardenas | H05B 3/565 |
| | | | 138/33 |
| 7,358,443 B2 * | 4/2008 | Shatkin | H01B 9/021 |
| | | | 174/103 |
| 7,987,592 B2 * | 8/2011 | Good | H01R 4/184 |
| | | | 439/585 |
| 9,093,194 B2 * | 7/2015 | McCullough | H01B 3/427 |
| 9,976,687 B2 * | 5/2018 | Goulet | B32B 5/08 |
| 2008/0289874 A1 | 11/2008 | Good et al. | |
| 2011/0089161 A1 | 4/2011 | McIver et al. | |
| 2016/0105930 A1* | 4/2016 | Kiss | H05B 3/12 |
| | | | 219/544 |
| 2018/0106526 A1 | 4/2018 | Kim et al. | |
| 2019/0063818 A1 | 2/2019 | Cho et al. | |
| 2019/0101235 A1 | 4/2019 | Schwarzkopf et al. | |
| 2019/0226751 A1 | 7/2019 | Pasqual et al. | |
| 2021/0033334 A1 | 2/2021 | Pasqual et al. | |
| 2023/0113674 A1 | 4/2023 | Pasqual et al. | |

FOREIGN PATENT DOCUMENTS

| | | |
|---|---|---|
| EP | 0802701 A2 | 10/1997 |
| WO | 0066959 A1 | 11/2000 |
| WO | 2019145780 A1 | 8/2019 |

* cited by examiner

SHEATHED FIBERGLASS HEATER WIRE

This application is a continuation of U.S. application Ser. No. 15/880,417, filed Jan. 25, 2018, entitled, "Sheathed Fiberglass Heater Wire," which is incorporated by reference herein in its entirety.

TECHNICAL FIELD

The subject matter described herein relates to a heater apparatus used in electric appliances such as a refrigerator.

BACKGROUND

A variety of electrical appliances often incorporate a heating apparatus to prevent frost from forming, to evaporate moisture, to prevent freezing of components, etc. For example, a refrigerator is often includes a freezer compartment, a refrigerator compartment, and a cooling portion. The cooling portion may provide cold air, via circulation of a refrigerant, to the freezer and refrigerator compartments. The cooling portion may also include one or more heaters to help manage temperature of the different compartments, defrost components or compartments, prevent freezing, etc.

Additionally, the refrigerator may include various electrical components such as various temperature sensors for detecting temperatures of various compartments provided in the refrigerator and detecting completion of defrosting, a fan that blows air to the respective compartments, and a damper for adjusting the amount of cold air blow are arranged in the refrigerator. These electrical components can be connected to a control substrate set up inside or outside the refrigerator via lead wires.

In some systems, the heater wires and/or lead wires may be exposed to a leaked refrigerant. Typical refrigerants have a relatively low ignition point and are flammable. Often heater wires and/or lead wires may operate at a surface temperature that could surpass the ignition point of the leaked refrigerant. Accordingly, it may be beneficial for improved heater wires and/or lead wires that maintain a low surface temperature.

SUMMARY

Apparatus, systems and methods for controlling the temperature of a heating element are disclosed.

In a first aspect, an apparatus includes a resistive wire having a circumference. The apparatus further includes a first fiberglass layer disposed about the circumference of the resistive wire and along a length of the resistive wire. The apparatus further includes a second fiberglass layer. The apparatus further includes a third fiberglass layer. The second fiberglass layer is disposed between the first fiberglass layer and the third fiberglass layer. The third fiberglass layer forms an outer layer and surrounds the second fiberglass layer.

In an interrelated aspect, a method is disclosed. The method includes providing a heater wire disposed within a tube of a refrigeration system. The heater wire includes a resistive wire having a circumference. The heater wire further includes a first fiberglass layer disposed about the circumference of the resistive wire and along a length of the resistive wire. The heater wire further includes a second fiberglass layer. The heater wire further includes a third fiberglass layer, the second fiberglass layer disposed between the first fiberglass layer and the third fiberglass layer, the third fiberglass layer forming an outer layer and surrounding the second fiberglass layer. The method further includes providing a current through the resistive wire to heat at least a portion of the refrigeration system.

In some variations one or more of the following features can optionally be included in any feasible combination. The apparatus or heater wire may also include a fiberglass core, the resistive wire wound about the fiberglass core. The first fiberglass layer can comprise an S-glass type fiberglass. The apparatus or heater wire may also include a kapton layer, the kapton layer forming an outer layer and surrounding the third fiberglass layer.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to particular implementations, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Appliance systems, like refrigerators, often incorporate heaters to control temperatures within the appliance system. For example, it may be desirable for the refrigerator to incorporate heaters to regulate temperature in various compartments to prevent unwanted freezing, condensation, or frost accumulation. The heaters may radiate heat from heater wires which receive power/current from lead wires within the refrigerator system. Often these wires may be placed near tubes or components that contain flammable refrigerants.

In the conventional systems, however, the surface temperature of tubes housing the heater and/or lead wires may increase during operation. In some cases, it is possible that the surface temperature rises high, possibly exceeding the ignition point of the flammable refrigerant. For example, refrigerant R600a (Isobutane) has an ignition temperature of 460° C. Hence, when the flammable refrigerant is used, it is beneficial that the heater/lead wires, and tubes containing the wires, never be a source of ignition of leaked refrigerants due to supply of power through the wires. Common insulation tubes used for the heater/lead wires include neoprene or double wall heat shrink tubing. Embodiments described herein, described improved systems and wire configurations that would reduce the threat of ignition in such cases.

For example, it may be beneficial to design a system where the surface temperature of parts that may be exposed to a leaked refrigerant may not exceed the ignition temperature of the refrigerant (e.g., 460° C. for R600a) reduced by 100° C. (e.g., 360° C.). In some aspects, the system may designed such that a maximum working surface temperature does not exceed 300° C. for the heater. Additionally, the system and the heating/lead wires may also have to comply with other requirements (e.g., energy efficiency requirements or size constraints). In some cases, the heater/lead wires may be configured to withstand a surge test procedure or satisfy other tests required for certification, approval, etc.

Figure 1:
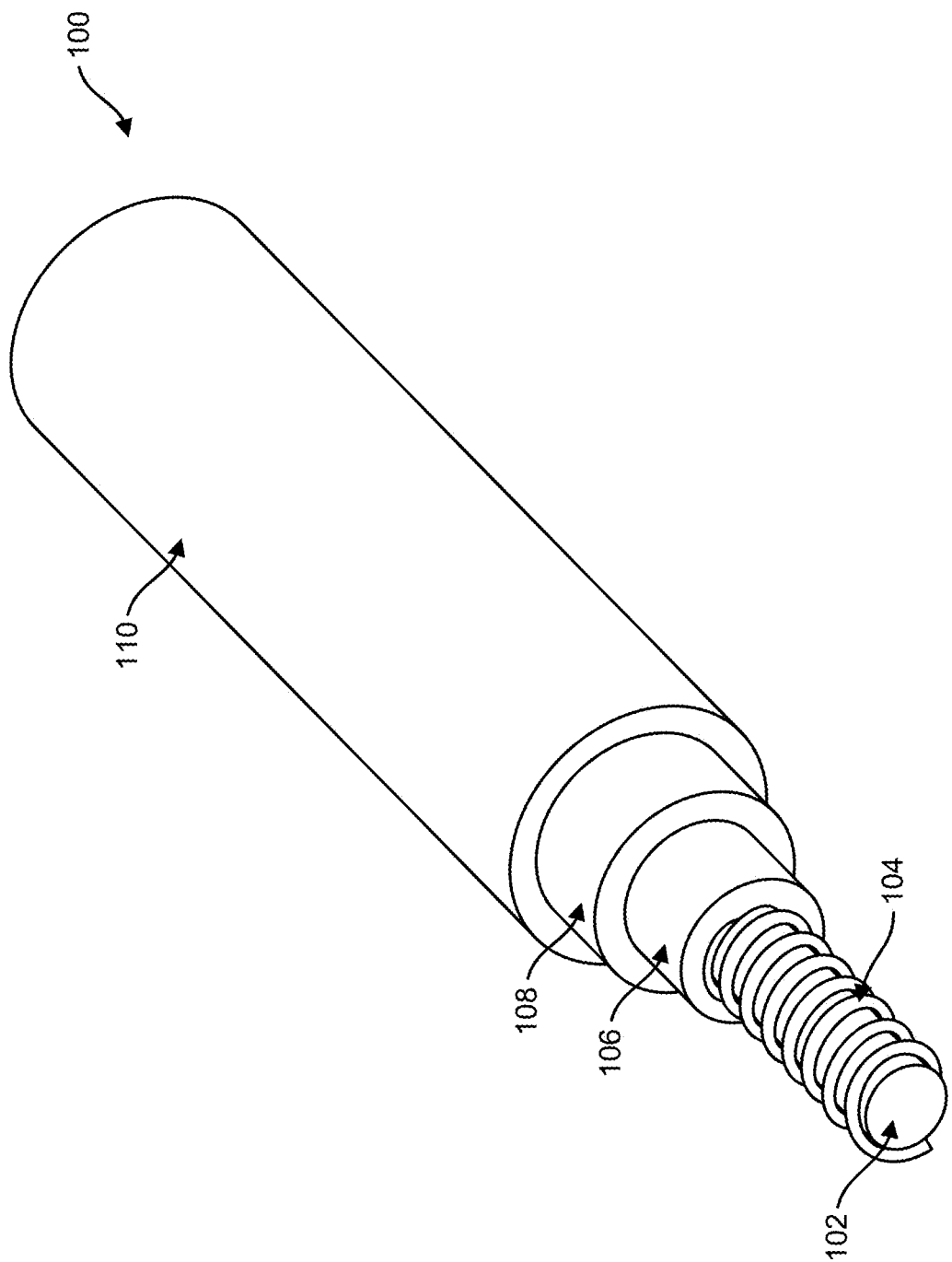
FIG. 1 is a cross-sectional diagram illustrating an exemplary embodiment of a heater wire, in accordance with certain aspects of the present disclosure.

FIG. 1 is a cross-sectional diagram illustrating an exemplary embodiment of a heater wire 100 for use in a refrigeration system, in accordance with certain aspects of the present disclosure. As shown in FIG. 1, the heater wire 100 comprises a fiberglass core 102, a resistive wire 104 wound around the fiberglass core 102, a first fiberglass layer 106, a second fiberglass layer 108, and a third fiberglass layer 110. As illustrated, the first fiberglass layer 106 is located between the resistive wire 104 and the second fiberglass layer 108, the second fiberglass layer 108 is located between the first fiberglass layer 106 and the third fiberglass layer 110, and the third fiberglass layer 110 is the outer layer with its inner surface coupled to the second fiberglass layer 108. While three fiberglass layers are shown in FIG. 1, more or fewer fiberglass layers are also possible. For example, the heater wire 100 can comprise four or five fiberglass layers to increase a total diameter of the heater wire 100. In some aspects, the heater wire 100 may also be used as a lead wire. In some implementations, the resistive wire 104 may comprise a nickel-chromium wire (e.g., 80-20 NiCr), Kanthal D wire, or any other suitable resistive wire. In some aspects, the resistive wire 104 can comprise a single or double resistance wire. In other aspects, the resistive wire 104 can comprise three or more wires.

In some aspects, the fiberglass material used for the fiberglass core 102 and the fiberglass layers 106, 108, and 110 may comprise the same or different fiberglass material. For example, the fiberglass core 102 and the first fiberglass layer 106 may comprise a first fiberglass material and the second and third fiberglass layers 108 and 110 may comprise a second fiberglass material. Additionally, each of the fiberglass core 102 and the fiberglass layers 106, 108, and 110 may comprise different fiberglass material, or any combination of fiberglass material. In some embodiments, the fiberglass material may comprise an S-glass type fiberglass.

Figure 2:
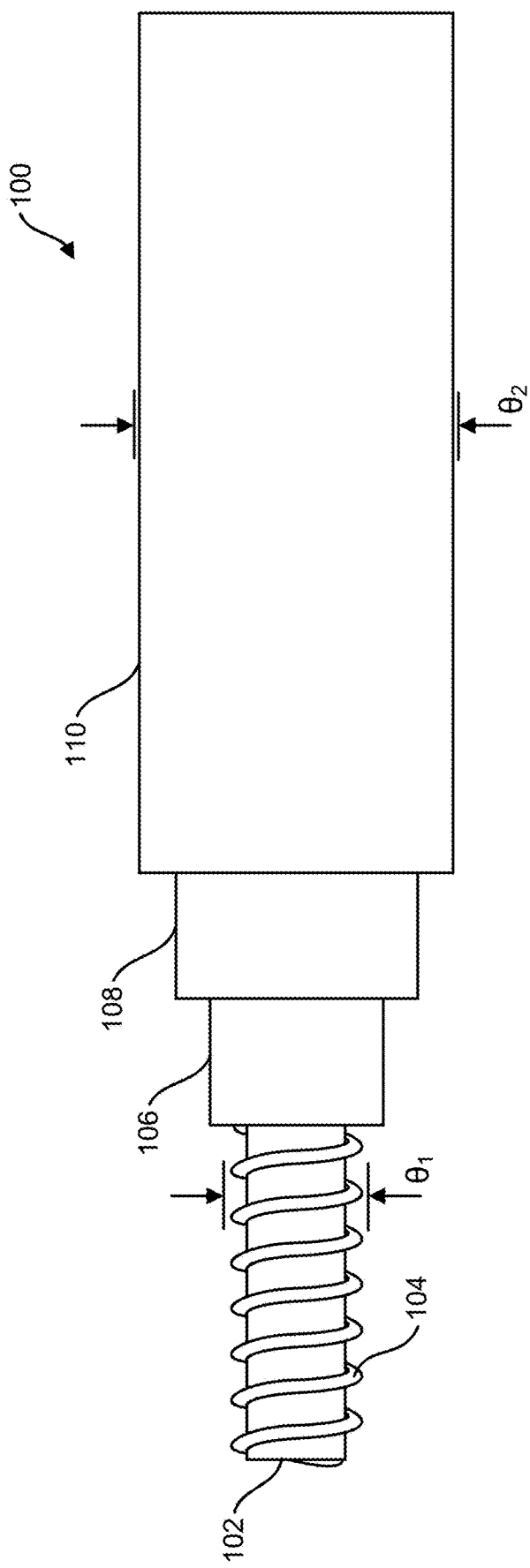
FIG. 2 is a side view of the heater wire, in accordance with certain aspects of the present disclosure.

FIG. 2 is a side view of the heater wire 100, in accordance with certain aspects of the present disclosure. As shown in FIG. 2, the resistive wire 104 wrapped around the fiberglass core 102 may have a first diameter $\theta_1$ and the entire heater wire 100 and the third fiberglass layer may have a second diameter $\theta_2$. The second diameter $\theta_2$ larger than the first diameter $\theta_1$. In some aspects, the second diameter $\theta_2$ comprise a diameter of 3.8-3.9 mm. In some embodiments the second diameter $\theta_2$ may configured to fit within a tube of the refrigerator or refrigeration system.

The heater wire 100 configuration may allow improved safety and performance within a refrigeration system. The heater wire 100 may exhibit increased ability to withstand high voltages compared to conventional heater wires. For example, the heater wire 100 may be configured to withstand a high potential (HIPOT) of up to 1500V. Additionally, the heater wire 100 may also withstand a surge test at 2000V without failure. The heater wire 100 may also exhibit reduced leakage current and greater insulation resistance compared to conventional heater wires. In some aspects, the heater wire 100 can be configured to exhibit a leakage current of less than 0.07 mA. The heater wire 100 can also exhibit an insulation resistance of greater than 2 GΩ. Such properties demonstrate an improved performance of heater wires used within conventional refrigeration systems.

Figure 3:
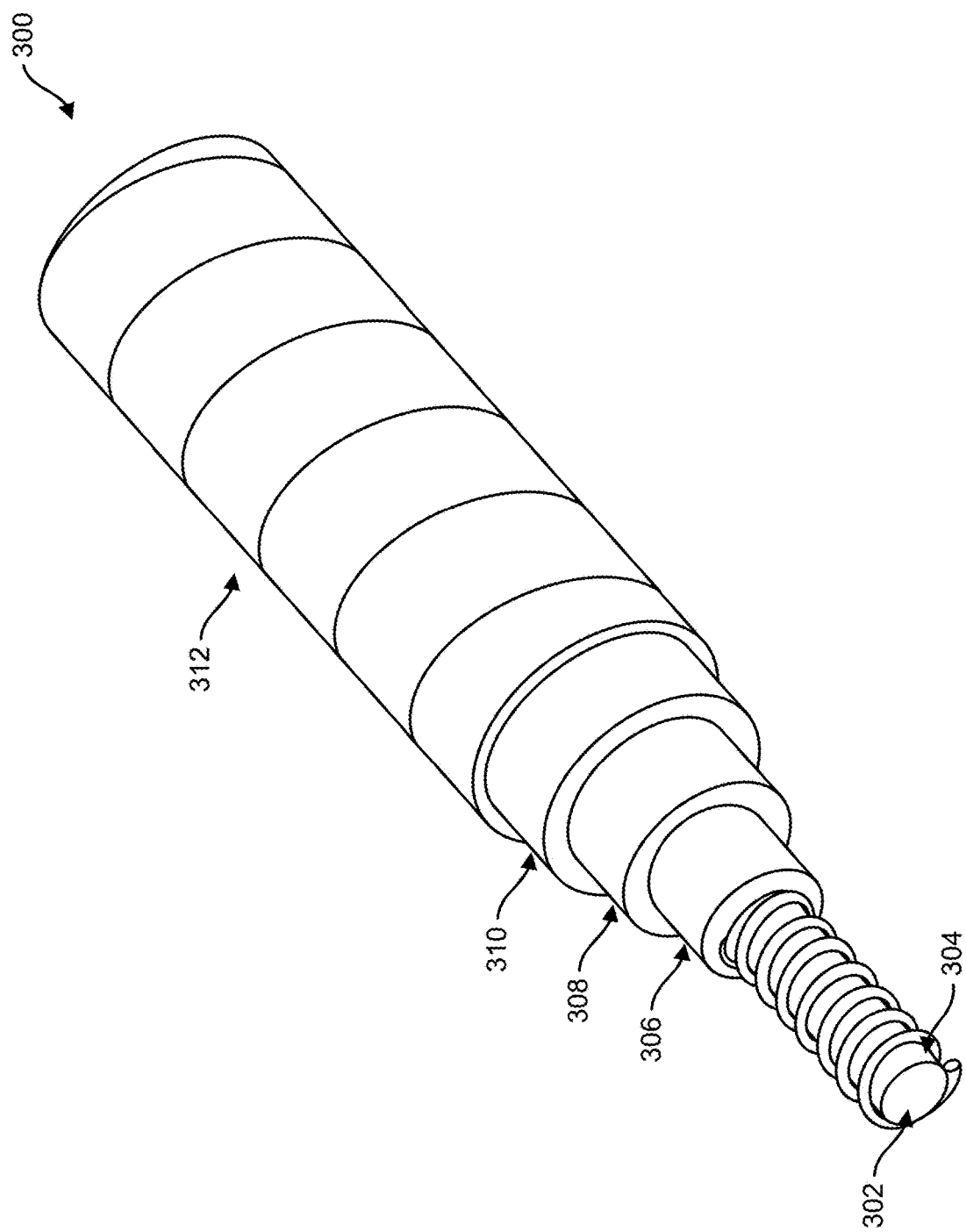
FIG. 3 is a cross-sectional diagram illustrating an exemplary embodiment of a heater wire, in accordance with certain aspects of the present disclosure.

FIG. 3 is a cross-sectional diagram illustrating an exemplary embodiment of a heater wire 300 for use in a refrigeration system, in accordance with certain aspects of the present disclosure. As shown in FIG. 3, the heater wire 300 comprises a fiberglass core 302, a resistive wire 304 wound around the fiberglass core 302, a first fiberglass layer 306, a second fiberglass layer 308, a third fiberglass layer 310, and a kapton layer 312.

As illustrated, the first fiberglass layer 306 is located between the resistive wire 304 and the second fiberglass layer 308, the second fiberglass layer 308 is located between the first fiberglass layer 306 and the third fiberglass layer 310, the third fiberglass layer 310 is located between the second fiberglass layer 308 and the kapton layer 312, and the kapton layer 312 is the outer layer of the heater wire 300 with its inner surface in contact with the third fiberglass layer 310. In some aspects, the heater wire 300 may also be used as a lead wire. In some embodiments, one or more of the fiberglass core 302, resistive wire 304, first fiberglass layer 306, second fiberglass layer 308, third fiberglass layer 310 may comprise the same or different material as the fiberglass core 102, resistive wire 104, and the fiberglass layers 106, 108, and 110 of the heater wire 100 of FIG. 1. While two fiberglass layers are shown in FIG. 3, other numbers of fiberglass layers are also possible. For example, the heater wire 300 can comprise three or more fiberglass layers to increase a total diameter of the heater wire 300.

In some implementations, the kapton layer 312 may comprise a tape of a polyimide film and silicone adhesive that is designed for high temperature masking applications, including the protection of printed circuit board gold finger contacts during wave soldering. The kapton layer 312 may beneficially increase the dielectric insulation capability of the heater and the heater wire 300. This may also increase the protection against unsafe failure during operation. In some implementations, the kapton layer 312 can comprise one or more layers. For example, the kapton layer 312 can comprise two or more kapton layer which can increase the total diameter of the heater wire 300.

For example, the heater wire 300 may exhibit increased ability to withstand high voltages compared to conventional heater wires and the heater wire 100. In some aspects, the heater wire 300 can be configured to withstand a surge test at 4000V without failure. The heater wire 300 may also exhibit reduced leakage current and greater insulation resistance compared to conventional heater wires and the heater wire 100.

In some aspects, the heater wires 100 and/or 300 are implemented in a refrigeration system. While embodiments described below apply to the heater wire 300, they may also apply to the heater wire 100. In the refrigeration system, the heater wire 300 may be connected to a power supply through lead wires. In some aspects, the power supply may comprise a battery, a wall power outlet, or another voltage/current supply. In some aspects, the heater wire 300 may be disposed within a tube of the refrigeration system. The tube may comprise a stainless steel tube, neoprene tube, a double wall heat shrink tube, a fiberglass tube, a glass tube, or any other suitable tubing.

As the power supply provides current through the heater wire 300, the heater wire 300 generates heat. A portion of that heat can be transferred to the tubing surrounding the heater wire 300, and the surface of the tubing can rise to a temperature less than the ignition point of the flammable refrigerant, thereby defrosting the peripheral parts. In some aspects, the heater wire 300 may also be configured to provide heat to evaporate moisture within the refrigeration system prevent frost from forming, and/or to prevent freezing of components of the refrigeration system.

In the event of a flammable refrigerant leaking in an area around the heater wire 300, the configuration of the heater wire 300 may beneficially keep the surface temperature of the heater wire 300, and any tube containing the heater wire 300, below the ignition point of the flammable refrigerant. As noted above, in some aspects, the heater wire 300 may be configured to have a maximum surface temperature at least 100° C. below the ignition point of the refrigerant. Hence, even if there is flammable refrigerant around the heater wire 300, accidents due to surface temperatures exceeding the ignition point can be prevented.

A person skilled in the art will appreciate that, while the methods, systems, and devices are disclosed herein for heater and/or lead wires in a refrigeration system, the methods, systems, and devices can be used in a variety of other electrical appliances, components, and systems.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. The implementations described above can be directed to various combinations and subcombinations of the disclosed features and/or combinations and subcombinations of further features noted above. Furthermore, above described advantages are not intended to limit the application of any issued claims to processes and structures accomplishing any or all of the advantages.

Additionally, section headings shall not limit or characterize the invention(s) set out in any claims that may issue from this disclosure. Specifically, and by way of example, although the headings refer to a "Technical Field," such claims should not be limited by the language chosen under this heading to describe the so-called technical field. Further, the description of a technology in the "Background" is not to be construed as an admission that technology is prior art to any invention(s) in this disclosure. Neither is the "Summary" to be considered as a characterization of the invention (s) set forth in issued claims. Furthermore, any reference to this disclosure in general or use of the word "invention" in the singular is not intended to imply any limitation on the scope of the claims set forth below. Multiple inventions may be set forth according to the limitations of the multiple claims issuing from this disclosure, and such claims accordingly define the invention(s), and their equivalents, that are protected thereby.

What is claimed is:

1. An apparatus for a refrigeration system, the apparatus having a heater wire configuration comprising:
    a resistive wire having a circumference;
    a first fiberglass layer in contact with the resistive wire, the first fiberglass layer disposed about the circumference of the resistive wire and along a length of the resistive wire;
    a second fiberglass layer comprising: an inner surface in contact with an outer surface of the first fiberglass layer; and an outer surface, the second fiberglass layer surrounding the first fiberglass layer; and
    a third fiberglass layer comprising an inner surface in contact with the outer surface of the second fiberglass layer; and an exposed outer surface, the second fiberglass layer disposed between the first fiberglass layer and the third fiberglass layer, the third fiberglass layer forming an outermost fiberglass layer and surrounding the second fiberglass layer, the exposed outer surface of the third fiberglass layer configured to be exposed to a leaked refrigerant, wherein the heater wire configuration limits a maximum temperature of the exposed outer surface of the third fiberglass layer to less than or equal to 360 degrees Celsius and a leakage current of the apparatus to less than 0.07 mA when a current is passed through the resistive wire to heat at least a portion of the refrigeration system, thereby preventing ignition of the leaked refrigerant in contact with the exposed outer surface of the third fiberglass layer.

2. The apparatus of claim 1, wherein the heater wire configuration further comprises a fiberglass core, the resistive wire wound about the fiberglass core.

3. The apparatus of claim 1, wherein the first fiberglass layer comprises an S-glass type fiberglass.

4. The apparatus of claim 1, wherein the first fiberglass layer comprises a fiberglass material different than a fiberglass material of the second fiberglass layer.

5. The apparatus of claim 2, wherein the fiberglass core and the first fiberglass layer each comprise a first fiberglass material; and wherein the second fiberglass layer and the third fiberglass layer each comprise a second fiberglass material different from the first fiberglass material.

6. The apparatus of claim 1, wherein the third fiberglass layer comprises a fiberglass material different than the first fiberglass layer and different than the second fiberglass layer.

7. The apparatus of claim 1, wherein the heater wire configuration further comprises a kapton layer, the kapton layer contacting the third fiberglass layer, the kapton layer comprising a polyimide film and silicone adhesive.

8. The apparatus of claim 7, wherein the kapton layer comprises two or more kapton layers.

9. The apparatus of claim 1, wherein the heater wire configuration limits the maximum temperature to less than or equal to 300 degrees Celsius when the current is passed through the resistive wire to heat at least the portion of the refrigeration system.

10. The apparatus of claim 1, wherein the apparatus is configured to be positioned within a tube of the refrigeration system, and wherein the heater wire configuration limits a maximum temperature of the tube to less than or equal to 360 degrees Celsius.

11. The apparatus of claim 1, wherein the heater wire configuration exhibits an insulation resistance greater than 2 GΩ.

12. The apparatus of claim 1, wherein the heater wire configuration is configured to withstand a surge test at 4000V without failure.

13. A method comprising:
providing a heater wire disposed within a tube of a refrigeration system, the heater wire comprising:
a resistive wire having a circumference;
a first fiberglass layer in contact with the resistive wire, the first fiberglass layer disposed about the circumference of the resistive wire and along a length of the resistive wire;
a second fiberglass layer comprising: an inner surface in contact with an outer surface of first fiberglass layer; and an outer surface, the second fiberglass layer surrounding the first fiberglass layer; and
a third fiberglass layer comprising an inner surface in contact with the outer surface of the second fiberglass layer; and an exposed outer surface, the second fiberglass layer disposed between the first fiberglass layer and the third fiberglass layer, the third fiberglass layer forming an outermost fiberglass layer and surrounding the second fiberglass layer, the exposed outer surface of the third fiberglass layer configured to be exposed to a leaked refrigerant; and
providing a current through the resistive wire to heat at least a portion of the refrigeration system, wherein the heater wire limits a maximum temperature of the exposed outer surface of the third fiberglass layer to 360 degrees Celsius and a leakage current of the heater wire to less than 0.07 mA when the current is provided through the resistive wire, thereby preventing ignition of the leaked refrigerant in contact with the exposed outer surface of the third fiberglass layer.

14. The method of claim 13, wherein the heater wire further comprises a fiberglass core, the resistive wire wound about the fiberglass core.

15. The method of claim 13, wherein the first fiberglass layer comprises an S-glass type fiberglass.

16. The method of claim 13, wherein the first fiberglass layer comprises a fiberglass material different than a fiberglass material of the second fiberglass layer.

17. The method of claim 14, wherein the fiberglass core comprises an S-glass type fiberglass.

18. The method of claim 13, wherein the third fiberglass layer comprises a fiberglass material different than the first fiberglass layer and different than the second fiberglass layer.

19. The method of claim 13, wherein the heater wire further comprises a kapton layer, the kapton layer forming an outer layer and surrounding the third fiberglass layer.

20. The method of claim 19, wherein the kapton layer comprises a polyimide film and silicone adhesive.

* * * * *